United States Patent [19]

Solhjell

[11] Patent Number: 5,264,972
[45] Date of Patent: Nov. 23, 1993

[54] METHOD AND APPARATUS FOR MAINTAINING TAPE TENSION IN A BELT-DRIVEN TAPE CARTRIDGE

[75] Inventor: Erik Solhjell, Oslo, Norway

[73] Assignee: Tandberg Data A/S, Oslo, Norway

[21] Appl. No.: 776,215

[22] Filed: Oct. 15, 1991

[51] Int. Cl.$^5$ ............ G11B 15/46; G11B 15/43
[52] U.S. Cl. ............ 360/73.04; 360/71; 360/72.3
[58] Field of Search ........ 360/73.04, 73.05, 71, 360/72.3

[56] References Cited

U.S. PATENT DOCUMENTS

| | | | |
|---|---|---|---|
| 4,095,732 | 6/1978 | Merritt | 360/72.3 |
| 4,335,411 | 6/1982 | Dischert | 360/72.3 |
| 4,341,363 | 7/1982 | Inatome | 360/73.04 |
| 4,531,166 | 7/1985 | Anderson | 360/73.05 |
| 4,557,434 | 12/1985 | Williams | 360/137 |
| 4,701,814 | 10/1987 | Westall | 360/72.2 |
| 4,821,129 | 4/1989 | Culp | 360/72.3 |
| 5,130,866 | 7/1992 | Klaassen et al. | 360/71 |
| 5,150,263 | 9/1992 | Sakamoto et al. | 360/73.04 |

OTHER PUBLICATIONS

3M Field Bulletin Data Cartridges, No. 28, pp. 58-59, Nov. 7, 1990.

*Primary Examiner*—John Zazworsky
*Attorney, Agent, or Firm*—Hill, Steadman & Simpson

[57] ABSTRACT

In a belt-driven tape cartridge of the type used to store data on a magnetic tape in a high speed data storage and retrieval system, the tape must be maintained at a proper tension within the cartridge so as to maintain the tape taut against the write/read head. Slackness in the tape occurs after a repeated number of changes in the tape transport direction or start/stop events, because the tension experienced by the tape is not the same in both transport directions. In a belt-driven cartridge, the tape tension cannot be directly monitored. A method and apparatus for maintaining tape tension in a belt-driven cartridge are disclosed wherein tape tension is indirectly monitored by non-mechanically monitoring a selected tape characteristic, the characteristic changing as the tape tension changes. If the monitored char,, exceeds a predetermined value, or after the passage of a selected amount of time, when the next reversal of tape transport direction occurs, the tape is moved a selected distance longer than necessary to effect the reversal so that when a desired data location on the tape reaches the location of the write/read head, the tape will again be at the proper tension.

16 Claims, 2 Drawing Sheets

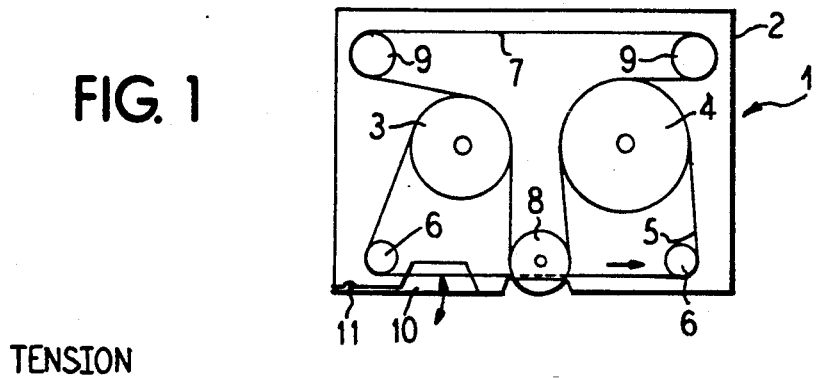
FIG. 1
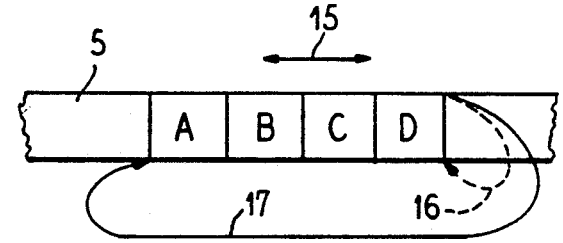
FIG. 2
FIG. 3
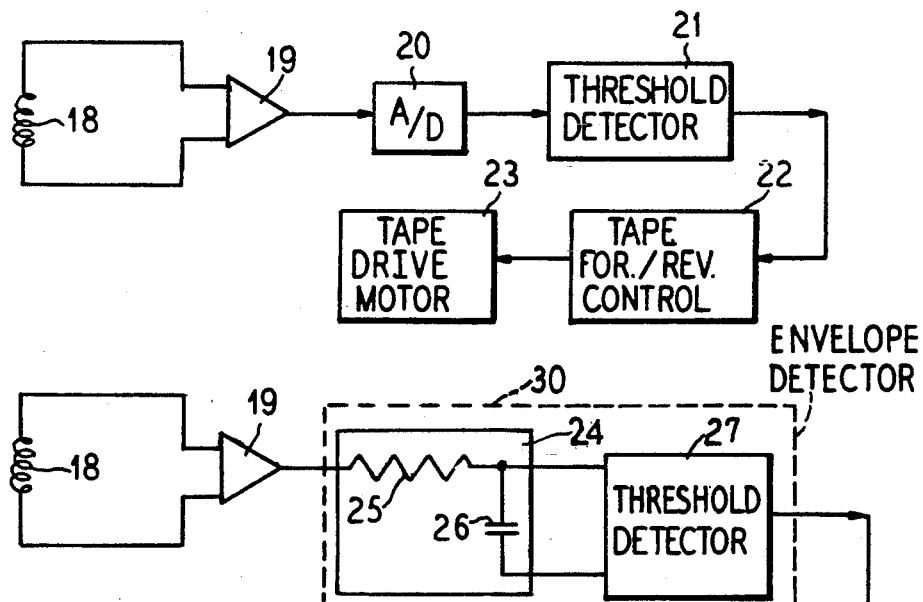
FIG. 4
FIG. 5
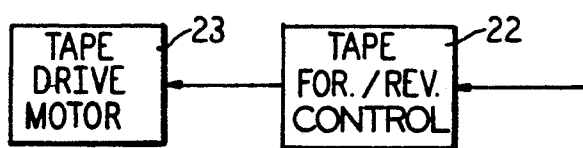

METHOD AND APPARATUS FOR MAINTAINING TAPE TENSION IN A BELT-DRIVEN TAPE CARTRIDGE

BACKGROUND OF THE INVENTION

1. Field of the Invention

The present invention relates to a method and apparatus for maintaining tape tension in a tape cartridge, particularly in a tape cartridge of the type used in high-speed data storage and retrieval systems.

2. Description of the Prior Art

In a conventional belt-driven data cartridge, as is referred to in the art as a Quarter Inch Cartridge or QIC, for use in a data storage and retrieval system, wherein the data is stored on and retrieved from a reeled magnetic tape, the tape in the transport is caused to move over a read/write head by means of which new data is written on, or existing data is read from, the moving tape. In such known cartridges, the tape is moved by a rubber belt which is entrained around the respective exterior tape layer on each of the feed reel and the take-up reel. The belt is also entrained around a drive roller within the cartridge, which engages an external drive roller located in a drive unit and, rotated by a drive motor, when the cartridge is inserted in the drive unit.

In such known belt-driven cartridges, there is no mechanical access to the tape or to the feed and take-up reels, since they are incased in the cartridge housing. Therefore, in order to maintain the tension in the tape at a proper level so that the tape is taut against the write/read head, the belt is entrained around two tension rollers in the cartridge. The tape must be moving for tension to be created.

In such systems a large number of so-called start/stop events occur. With each start/stop event the tape is braked and must be rewound a short distance to bring the tape to a location adjacent the write/read head at which data entry or data reaching ceased. Since each small rewind creates a slight loss of tension (but the tension does not drop to zero), as such start/stop events accumulate, the tape becomes increasingly slack.

Another problem caused by slackness in the tape is that, if the tape is to be rewound so as to bring a particular tape location to be disposed adjacent the write/read head, the slackness in the tape will reduce the accuracy with which the tape can be positioned, so that the desired tape location may not be precisely disposed in front of the write/read head.

A detailed discussion of the phenomenon of tape tension in cartridges of this type is found in 3M Field Bulletin Data Cartridges, No. 28, Nov. 7, 1990.

SUMMARY OF THE INVENTION

It is an object of the present invention to provide an apparatus for maintaining tape tension in a magnetic tape in a belt-driven tape cartridge in a system wherein the tape is subjected to a large number of reversals in direction of tape transport and/or start/stop events.

It is a further object of the present invention to provide a method for maintaining tape tension in the same context.

The above objects are achieved in accordance with the principles of the present invention in an apparatus wherein a selected characteristic of the tape is non-mechanically monitored during transport, the characteristic changing as the tape tension changes. When the characteristic exceeds a predetermined value, the tape is rewound to a sufficient extent to restore the desired tension before proceeding with the next write or read operation. Thus, instead of attempting to directly monitor tape tension, which is not possible in a belt-driven tape cartridge, tape tension is indirectly monitored by non-mechanically monitoring a characteristic of the tape which is indicative of tape tension.

The selected characteristic which varies with tape tension may simply be the time of tape transport or the distance of tape transport, and a rewind operation which restores tape tension may therefore simply be initiated after the passage of a selected amount of time, or after the tape has been transported a specified distance.

In another embodiment of the invention, the edge of the tape, or a selected track thereon, can be monitored as to position relative to the write/read head. Obtaining a signal which corresponds to the position of the tape edge (for other purposes) using a read gap is well-known in the art, as exemplified by U.S. Pat. No. 4,476,503. Normally such a signal is used for positioning the read/write head relative to a selected data track on the tape (the data tracks being located at known distances from the tape edge). In accordance with the invention, however, this signal is used as an indicator (not a direct measurement) of tape tension based on the inventor's observation that, as the tape becomes slack due to a reduction in tape tension, the selected track or the tape edge will exhibit a slightly ungulating or sinusoidal motion, as opposed to a substantially straight path when the proper tension is present. The signal corresponding to the position of the tape edge or a selected track is an analog signal. This signal can be converted into a digital signal in an analog-to-: digital converter, and the amplitude of the digital signal can be monitored in a threshold detector. If the amplitude exceeds a selected value, the threshold detector will supply a signal to the unit which instructs the tape drive motor as to which direction to operate, i.e., to either advance the tape or reverse the tape. If a signal has been received from the threshold detector indicating tension in the tape has been reduced to a predetermined level, the control unit will operate the drive motor so that when the next rewind occurs, the tape is rewound by a specified amount which is more than the amount needed to reach the intended data location on the tape. The tape will then have to be advanced by this specified distance before the desired tape location is positioned in front of the write/read head. As the tape is advanced in the forward direction by this specified amount, the tension will be increased so that by the time the desired tape location is disposed adjacent the write/read head, the proper tension will be restored.

In another embodiment, which retains the analog nature of the signal, the envelope of the analog signal corresponding to the position of the tape edge or the specified track can be monitored by subjecting the signal to an integrator, with the output of the integrator being supplied to an analog-threshold detector. The threshold detector supplies a signal to the tape drive control unit when the envelope has a magnitude indicating that tape tension has been reduced below a tolerable level, and tape tension is restored in the manner described above.

DESCRIPTION OF THE DRAWINGS

FIG. 1 is a plan view of a conventional tape cartridge.

FIG. 2 is a graph showing the tension exhibited by the tape in the cartridge of FIG. 1 in forward and reverse directions of transport.

FIG. 3 is a schematic illustration of a tape in the cartridge of FIG. 1 for explaining the method and apparatus for maintaining tape tension in accordance with the principles of the present invention.

FIG. 4 is a schematic block diagram of a first embodiment of an apparatus constructed in accordance with the principles of the present invention for maintaining tape tension in a tape cartridge.

FIG. 5 is a schematic block diagram of a second embodiment constructed in accordance with the principles of the present invention for maintaining tape tension in a tape cartridge.

DESCRIPTION OF THE PREFERRED EMBODIMENTS

Figure 6:
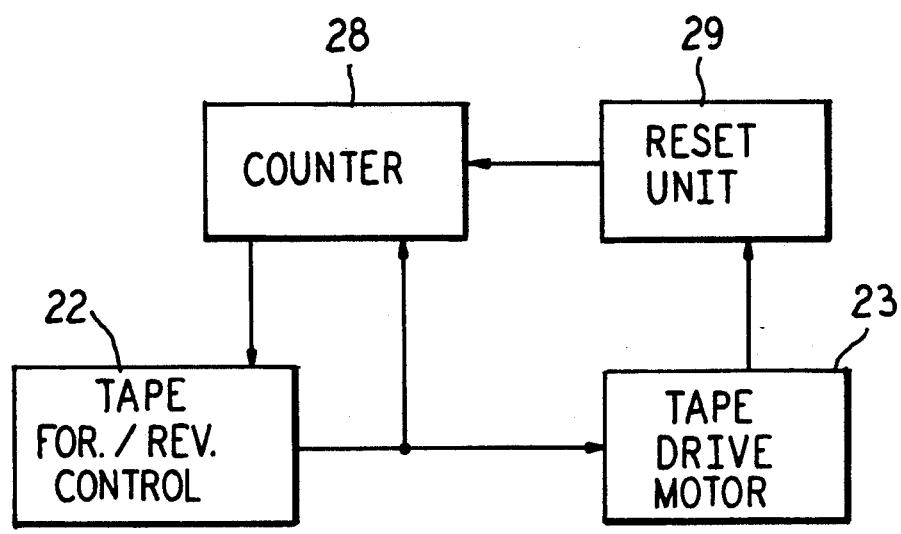
FIG. 6 is a schematic block diagram of a third embodiment constructed in accordance with the principles of the present invention for maintaining tape tension in a tape cartridge.

A conventional tape cartridge 1 is shown schematically in FIG. 1. The cartridge has a housing 2 in which all of the components are contained. Inside the housing 2 are a feed reel 3 and a take-up reel 4, mounted so as to be rotatable within the housing 2. A magnetic tape 5 is entrained around the reels 3 and 4. In the direction of forward transport of the tape 5, indicated by the straight arrow, the tape 5 will be unwound from the reel 3 and wound onto the reel 4. The reel 4 has a slightly larger diameter than the reel 3 (shown exaggerated in FIG. 1) so that the tape 5 must travel a slightly longer distance around the reel 4 than around the reel 3. When the tape 5 is moving in the forward direction, therefore, a tension will be exerted on the tape 5. The tape 5 is also entrained around two capstans 6 so as to travel in a straight path therebetween. The factors relating to tension build-up in a belt-driven tape cartridge are fully explained in 3M Field Bulletin Data Cartridges, No. 28, Nov. 7, 1990, pages 57–59 ("Data Cartridge Theory of Operation," von Behren).

The reels 3 and 4 are caused to rotate by a flexible belt 7 which partially wraps each of the reels 3 and 4. The belt 7 is entrained around a drive roller 8 as well as around two turning rollers 9. The drive roller 8 is disposed about the straight path of the tape 5 between the cap stands 6, so that the drive roller 8 does not interfere with the travel of the tape 5 along that straight path. The housing 2 has an opening exposing a portion of the drive roller 8. When the cartridge 1 is inserted in a known manner in a drive unit, another drive roller (not shown) mounted in the drive unit engages the drive roller 8. The drive roller in the drive unit is caused to rotate by a drive motor (referred to in FIGS. 4, 5 and 6 below as a tape drive motor 23) so that the drive roller 8 is rotated and the belt 7 in turn rotates the reels 3 and 4. Depending upon the direction of operation of the tape drive motor, the drive roller 8 will be rotated in a direction so as to cause the tape 5 to be advanced in the forward direction indicated by the straight arrow, or in a reverse direction opposite thereto.

When the tape cartridge 1 is inserted in the drive unit, a dust cover 10 is caused to be opened in a known manner, such as by exerting a force at one end of the dust cover 10 thereby causing the dust cover 10 to rotate as shown by the curved arrow about a pivot pin 11, by means of which the dust cover 10 is mounted in the housing 2. This exposes a portion of the tape 5 in its straight path of travel. A write/read head (not shown) mounted in the drive unit, is positioned at the location of the opened dust cover so as to press against the tape 5. As the tape 5 is transported in the forward direction, the tension caused by the difference in diameters of the reels 3 and 4 exerts a tension on the tape 5 so that the tape 5 is maintained taut against the surface of the write/read head.

As shown in FIG. 2, the tension experienced by the tape is different as the tape is transported in the forward direction than as the tape is transported in the reverse direction. In FIG. 2, tension is shown on the vertical axis and direction of tape movement from the beginning of tape (BOT) to the end of tape (EOT) on the horizontal axis. The portion of the curve referenced 12 indicates the tension experienced by the tape as it moves in a direction from BOT to EOT. A direction reversal is indicated at 13, and the portion of the curve referenced 14 indicates the tension experienced by the tape moving from EOT to BOT. Each time a reversal 13 occurs, therefore, a certain amount of slackness is introduced, which increases the longer the tape is run in the reverse direction.

The general concept of the method disclosed herein is schematically indicated in FIG. 3. FIG. 3 shows a magnetic tape 5 having a plurality of data blocks A, B, C and D thereon (in practice there will be thousands of such blocks on a tape). The forward and reverse directions of tape movement are indicated by the double arrow 15. In a conventional tape drive system, after data had either been written into or read from block D, the drive unit would be braked, and if necessary a slight rewind 16 would be undertaken to accommodate for any tape movement occurring during the breaking. Thus when a read or write operation with respect to block D is completed, and the system is awaiting its next instruction to move the tape from the end of block D, the end of block D will be (theoretically) disposed precisely in front of the write/read head. In practice, however, due to the slackness introduced by repeated direction reversals, the conventional rewind 16 may not cause the end of block D to be precisely in front of the write/read head. The distance which the tape will be moved to bring the next desired location in front of the write/read head, however, is determined on the assumption that the end of block D is precisely positioned in front of the write/read head. If this is not so, due to the tape slackness, the next position to which the tape is moved will embody this imprecision, which will continually increase with repeated re-positionings.

In accordance with the principles of the present invention, therefore, a selected tape characteristic which changes with tape tension is non-mechanically monitored, and when the characteristic exceeds a predetermined amount, indicating that tape tension is below a satisfactory level, a longer rewind 17 will be undertaken, for example, moving the tape so that the beginning of a different block, such as block A is in front of the write/read head. The tape 5 will thus have to be advanced the extra distance corresponding to the beginning of block A and the end of block D, which has been selected so as to restore the tape tension to the desired level.

The selected characteristic which is monitored may simply be time, and if a predetermined number (or more) of start/stop events occurs in a given time, the longer rewind 17 is undertaken. The characteristic may also be distance of tape travel, and if a predetermined number of start/stop events occurs per a given distance of tape transport, the larger rewind 17 will be undertaken. The characteristic may alternatively be the position of a tape edge or a tape track, which can be monitored in a known manner, such as by the use of an extra magnetic pick-up disposed in the write/read head for this purpose, as described in U.S. Pat. No. 4,476,503. When the tape 5 is subjected to proper tension, the path of tape travel will be substantially straight, and therefore the tape edge or the selected data track will also be substantially straight and therefore the signal indicating its position will be substantially constant. When the tape 5 becomes slack, however, the tape edge or the selected data track will ungulate and will follow a generally sinusoidal path. When the degree of departure from a substantially straight path indicates that tape tension has fallen below an acceptable amount, a signal is generated causing the larger rewind 17 to be undertaken.

A first embodiment of an apparatus operating in accordance with, the above method is shown in FIG. 4. In this embodiment, the extra magnetic pick-up is schematically indicated as a coil 18, the output of which is supplied to an amplifier 19. The analog output of the amplifier 19 is supplied to the input of an analog-to-digital converter 20, which generates a digital pulse train which is supplied to the input of a threshold detector 21. As the analog signal from the coil 18 becomes increasingly sinusoidal, the duration or amplitude of the pulses in the pulse train supplied to the threshold detector 21 will increase. When the amplitude or duration exceeds a predetermined value, the threshold detector 21 generates a signal which is supplied to a tape forward/reverse control unit 22. The tape forward/reverse control unit 22 controls the operation of the aforementioned tape drive motor 23, and in particular supplies a signal to the tape drive motor 23 instructing which direction the motor is to operate, which in turn determines the direction of tape transport (i.e., forward or reverse). The duration of the signal supplied by the tape forward/reverse control unit 22 determines the length of time which the tape drive motor 23 will operate in a particular direction. As long as the tape tension is within an acceptable level, the tape forward/reverse control unit 22 operates the tape drive motor 23 in a normal manner, so as to execute the short rewind 16 as needed. Upon receiving the signal from the threshold detector 21, however, the tape forward/reverse control unit 22 supplies a signal to the tape drive motor 23 causing the longer rewind 17 shown in FIG. 3. Proper tape tension is thereby restored, and the analog signal from the coil 18 will resume its substantially constant level, until tape tension again becomes unacceptably reduced.

Another embodiment also making use of an extra magnetic pick-up is shown in FIG. 5, the pick-up again being indicated by a coil 18, which supplies a signal to an amplifier 19. In the embodiment of FIG. 5, the output of the amplifier 19 is supplied to an envelope detector 30 which includes an integrator 24, formed by a resistor 25 and a capacitor 26. The output of the integrator 24 represents the envelope of the signal from the coil 18. The output of the integrator 24 is supplied to a threshold detector 27. When the envelope exceeds a predetermined value, the envelope detector 27 supplies a signal to the tape forward/reverse control 22, which operates as described in connection with the embodiment of FIG. 4 to effect the longer rewind 17.

Another embodiment of an apparatus for maintaining tape tension constructed in accordance with the principles of the present invention is shown in FIG. 6. In this embodiment, the tape forward/reverse control unit 22 operates as described above to control the tape drive motor 23 through a number of start/stop events. Each time the tape forward/reverse control unit 22 supplies a signal to the tape drive motor 23 indicating a reversal in direction, that signal is also supplied to a counter 28. When the counter 28 reaches a specified count before being reset by a reset unit 29, the counter supplies a signal to the tape forward/reverse control unit 22, which in turn operates the tape drive motor 23 to effect the longer rewind 17. In the embodiment of FIG. 6, therefore, it is assumed that a given number of start/stop events, occurring within the limits set by the reset unit 29 as described below, will necessarily have created sufficient slack in the tape 5 so as to require the longer rewind 17.

The reset unit 29 may operate based on elapsed time or on distance of tape travel as the basis for supplying a reset signal to the counter 28. If operating on the basis of time, the reset unit 29 receives a signal from the tape drive motor 23 whenever the tape drive motor 23 is running. This signal may be a standard clock signal, an rpm count, or any suitable signal corresponding to time of operation of the tape drive motor 23. Upon the passage of a selected amount of operational time of the tape drive motor 23, the reset unit 29 generates a reset signal which is supplied to the counter 29. If the counter 28 has not exceeded a count corresponding to the count at which the longer rewind 17 is to be undertaken before being reset by the reset unit 29, the counter is reset to zero. If the count in the counter 28 reaches the specified value before the elapse of the specified time as monitored by the reset unit 29, the longer rewind 17 is initiated as described above.

Alternatively, the reset unit 29 may measure the distance of tape travel, and use that value as the basis for generating the reset signal. Again, this may be obtained from a signal form the tape drive motor 23 indicative of the duration of operation of the tape drive motor 23, an rpm signal, or the like. Any of these signals can, by a simple calculation be correlated with the distance traveled by the tape. When the distance traveled by the tape reaches a specified level, the reset unit 29 supplies a signal to the counter 28. Again, if the count has not reached a level within the counter 28 indicating the necessity of a longer rewind 17 before receipt of the reset signal, the counter is reset to a count of zero.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for a maintaining tension of a tape running between two tape reels in a belt-driven tape cartridge wherein said tape reels and a drive roller are entrained and rotated by a belt without mechanical access to said tape or said tape reels and wherein tension of said tape increases as said tape is transported in a forward direction, said method comprising the steps of:

monitoring tape tension indirectly by non-mechanically monitoring a characteristic of said tape which changes with tape tension;

determining when said characteristic reaches a selected value corresponding to an unacceptably low tension;

rewinding said tape, when said selected value is reached, by a distance sufficient to restore tape tension to an acceptable level after said tape is transported in a forward direction by said distance; and advancing said tape in said forward direction by said distance to restore tape tension to said acceptable level.

2. A method as claimed in claim 1 wherein the step of monitoring a characteristic of said tape which changes with tape tension is further defined by monitoring the position of one of an edge or a selected track on said tape.

3. A method as claimed in claim 2, wherein the step of determining when said characteristic reaches a selected value is further defined by the steps of:

generating an analog signal corresponding to said position;

converting said analog signal into a digital signal;

detecting when a parameter of said digital signal exceeds a predetermined threshold; and generating a signal to initiate said rewinding of said tape when said parameter reaches said threshold.

4. A method as claimed in claim 2 wherein the step of determining when said characteristic reaches a selected value is further defined by the steps of:

generating an analog signal corresponding to said position;

integrating said analog signal to obtain an envelope signal;

detecting said envelope signal to identify when said envelope signal exceeds a predetermining value; and generating a signal for initiating said rewinding of said tape when said envelope signal exceeds said predetermined value.

5. A method as claimed in claim 1 wherein the step of monitoring a characteristic of said tape which changes with tape tension is further defined by monitoring the number of start/stop events of said tape over a given time duration.

6. A method as claimed in claim 1 wherein the step of monitoring a characteristic of said tape which changes with tape tension is further defined by monitoring the number of start/stop events of said tape which occur over a given distance of tape travel.

7. A method for maintaining tension of a tape running between two tape reels in a belt-driven tape cartridge wherein said tape reels and a drive roller are entrained and rotated by a belt without mechanical access to said tape or said tape reels and wherein tension of said tape increases of said tape is transported in a forward direction, said method comprising the steps of:

monitoring tape tension indirectly by monitoring the number of start/stop events of said tape;

undertaking a normal rewind of said tape upon the occurrence of each start/stop event of said tape; and undertaking a tension-restoring rewind of said tape, longer than said normal rewind by a selected amount, upon the occurrence of a predetermined number of start/stop events.

8. A method as claimed in claim 7 comprising the additional step of:

requiring said predetermied number of start/stop events to occur within a selected time duration.

9. A method as claimed in claim 7 comprise the additional step of:

requiring said predetermined number of start/stop events to occur within a predetermined distance of tape travel. and wherein tension of said tape increases as said tape is transported in a forward direction, said method comprising the steps of:

monitoring tape tension indirectly by monitoring the number of start/stop events of said tape;

undertaking a normal rewind of said tape upon the occurrence of each start/stop event of said tape; and undertaking a tension-restoring rewind of said tape, longer than said normal rewind by a selected amount, upon the occurrence of a predetermined number of start/stop events.

10. An apparatus for maintaining tension of a tape running between two tape reels in a belt-driven tape cartridge wherein said tape reels and a drive roller are entrained and rotated by a belt without mechanical access to said tape or said tape reels and wherein tension of said tape increases as said tape is transported in a forward direction, said apparatus comprising:

means for indirectly monitoring tape tension by on mechanically monitoring a characteristic of said tape which changes with tape tension;

means for determining when said characteristic reaches a selected value corresponding to an unacceptably low tension;

means for rewinding said tape, when said selected value is reached, by a distance sufficient to restore tape tension to an acceptable level after said tape is transported in a forward direction by said distance; and means for advancing said tape in said forward direction by said distance to restore tape tension to said acceptable level.

11. An apparatus as claimed in claim 10 wherein said means for monitoring a characteristic of said tape is a means for counting the number of start/stop events of said tape within a specified limit.

12. An apparatus as claimed in claim 11 wherein said means for counting the number of start/stop events of said tape within a specified limit is a means for counting the number of start/stop events of said tape within a predetermined time duration.

13. An apparatus as claimed in claim 11 wherein said means for counting the number of start/stop events of said tape within a specified limit is a means for counting the number of start/stop events of said tape occurring within a predetermined distance of tape travel.

14. An apparatus as claimed in claim 10 wherein said means for monitoring a characteristic of said tape is a means for monitoring the position of at least one of an edge of said tape or a track on said tape during transport of said tape, and for generating an analog signal corresponding to said position.

15. An apparatus as claimed in claim 14 wherein said means for determining when said characteristic reaches a selected value comprises:

means for converting said analog signal into a digital signal consisting of a series of pulses; and threshold detector means for generating a signal, for controlling said means for rewinding said tape, when a selected parameter of a pulse of said digital signal reaches a predetermined threshold.

16. An apparatus as claimed in claim 14 wherein said means for determining when said characteristic reaches a selected value comprises:

means for integrating said analog signal to obtain an envelope signal; and
means for evaluating said envelope signal for generating a control signal for said means for rewinding said tape when said envelope reaches said selected value.

* * * * *